United States Patent [19]
Wagner et al.

[11] Patent Number: 5,880,413
[45] Date of Patent: Mar. 9, 1999

[54] ASSEMBLY FOR MOUNTING OF A MUFFLER; COMBINATION AND METHOD

[75] Inventors: Wayne M. Wagner, Apple Valley, Minn.; Eivind Stenersen, River Falls, Wis.; David E. Winnes, Bloomington, Minn.

[73] Assignee: Dnaldson Company, Inc., Minneapolis, Minn.

[21] Appl. No.: 977,174

[22] Filed: Nov. 24, 1997

[51] Int. Cl.⁶ .................................................. F01N 7/00
[52] U.S. Cl. ...................... 181/211; 181/282; 181/243
[58] Field of Search .................................. 181/211, 227, 181/228, 243, 282; 243/610, 674

[56] References Cited

U.S. PATENT DOCUMENTS

| | | | |
|---|---|---|---|
| Re. 30,042 | 7/1979 | Hiemstra et al. . | |
| 2,026,446 | 12/1935 | Trott | 181/243 |
| 2,081,546 | 5/1937 | MacPherson | 181/228 |
| 2,160,808 | 6/1939 | Bradley | 181/243 |
| 3,386,526 | 6/1968 | Pannone | 181/243 |
| 3,746,127 | 7/1973 | Leventhal | 181/243 |
| 3,944,265 | 3/1976 | Hiemstra et al. . | |
| 4,183,122 | 1/1980 | Wagner . | |
| 4,558,891 | 12/1985 | Wagner et al. . | |
| 4,790,574 | 12/1988 | Wagner et al. . | |
| 5,116,083 | 5/1992 | Gillingham et al. . | |

*Primary Examiner*—Khanh Dang
*Attorney, Agent, or Firm*—Merchant, Gould, Smith, Edell, Welter & Schmidt, P.A.

[57] ABSTRACT

A combination comprises a muffler and a mounting band constructed and arranged to secure the muffler in a hanging orientation. The mounting band includes a continuous, arcuate metallic strap having first and second ends. The metallic strap is positioned in extension circumferentially around the muffler. The first and second ends of the metallic strap are welded to one another to retain the metallic strap as a continuous band around the muffler. The hanger is secured to a continuous portion of the metallic strap. The hanger is centered radially along the strap, at a location about 150°–210° from the weld of the strap ends.

14 Claims, 5 Drawing Sheets

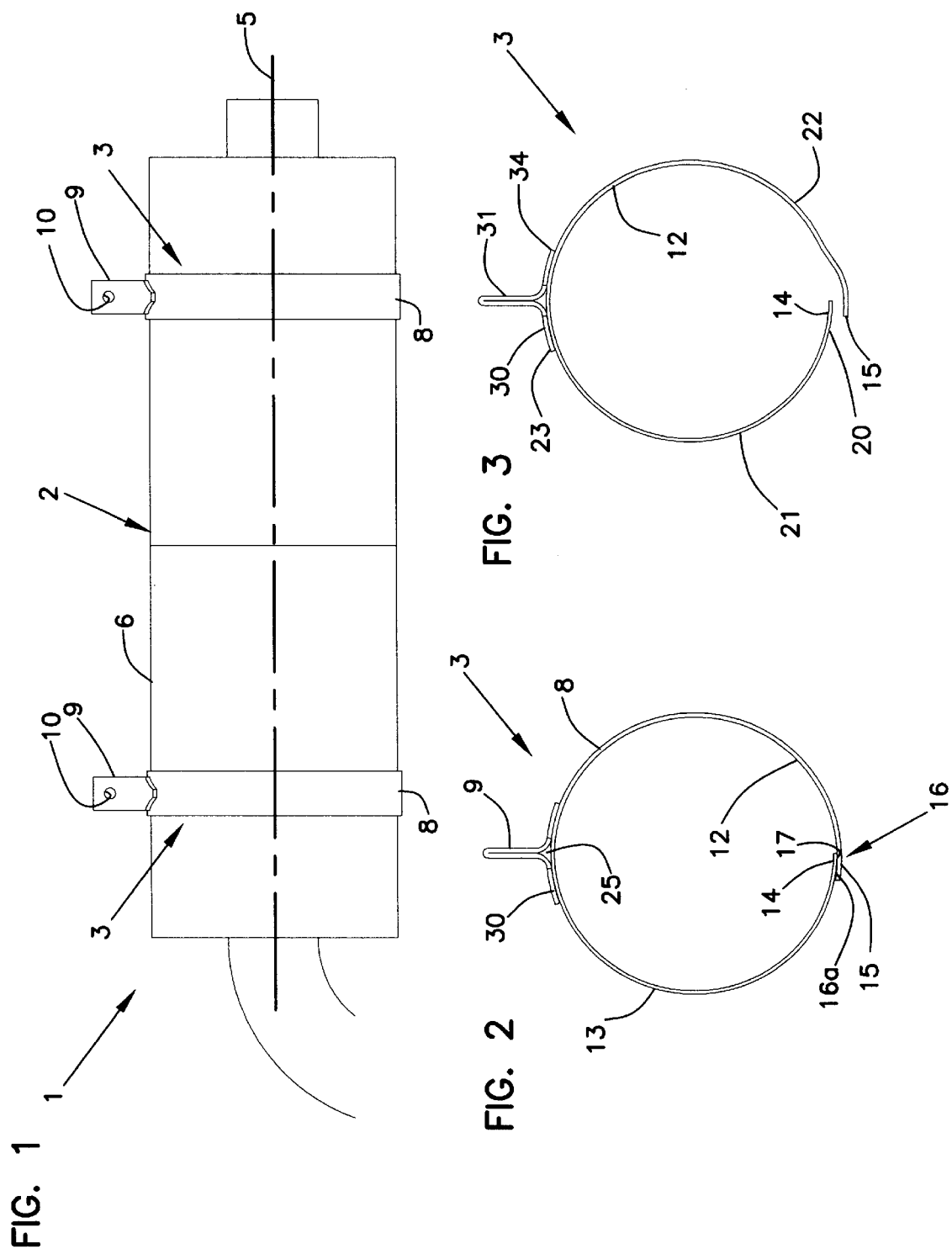

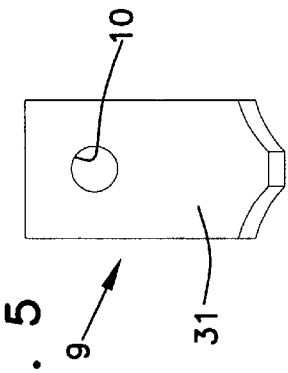
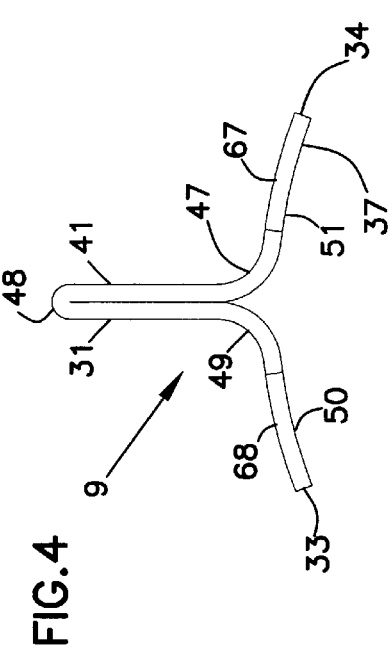
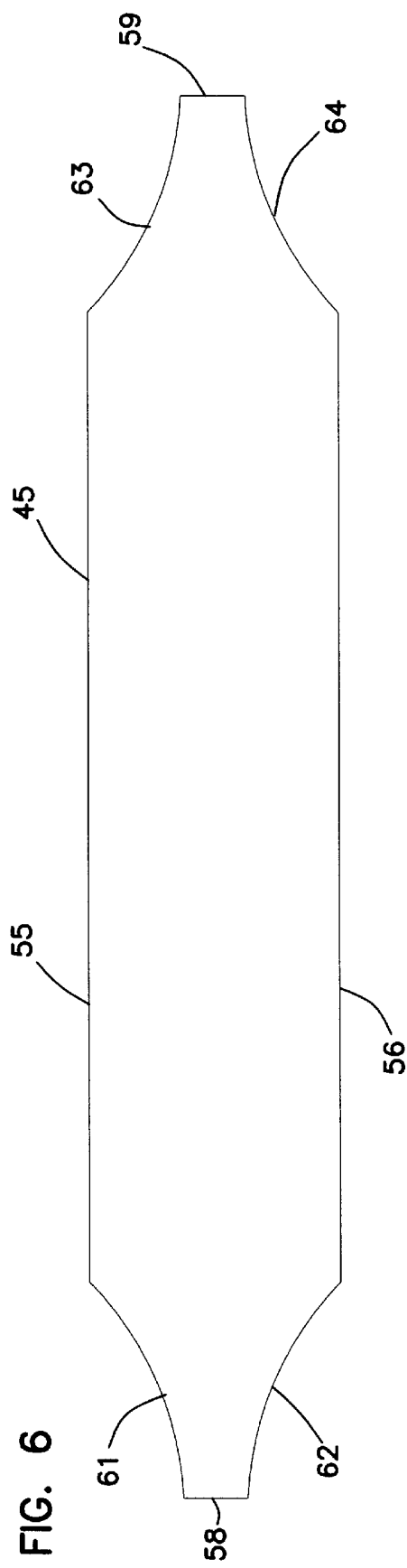

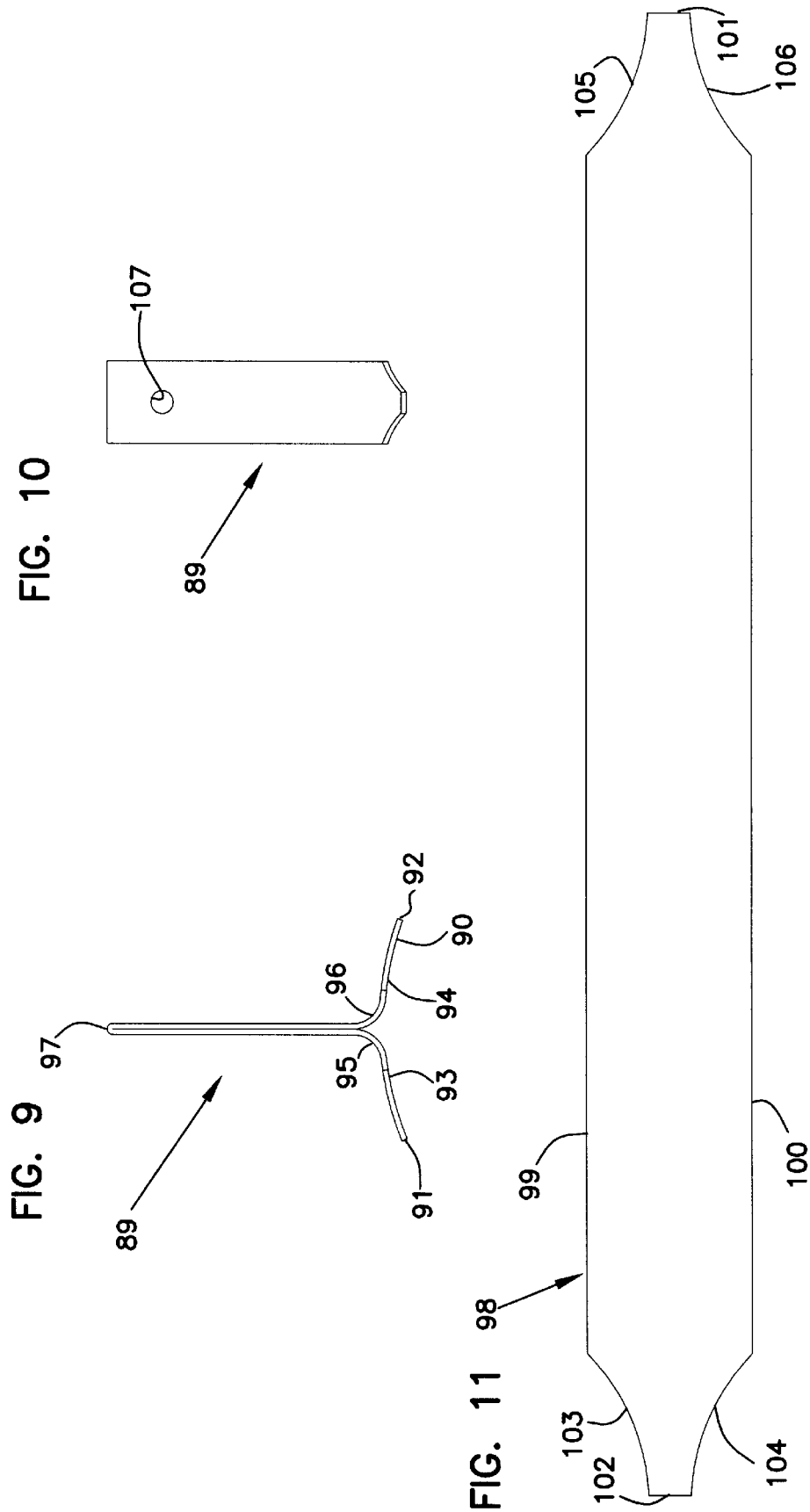

ASSEMBLY FOR MOUNTING OF A MUFFLER; COMBINATION AND METHOD

FIELD OF THE INVENTION

The present invention relates to mufflers. It particularly concerns methods and apparatus for mounting mufflers. The arrangements particularly concern mounting large mufflers (10 inch outside diameter or greater), on vehicles such as trucks, in a horizontal position.

BACKGROUND OF THE INVENTION

In general, truck mufflers, are generally cylindrical bodies. They typically weigh 25 or more lbs., often 30–50 lbs. Many such mufflers are mounted horizontally, under the framework of trucks.

A wide variety of muffler mounting arrangements have been used. In general, a horizontally mounted muffler requires at least two hanger points. These are generally created by mounting two bands around the outer periphery of the cylindrical muffler. The bands are generally secured around the muffler by either bolts or welds. The bands generally include two hangers thereon. The muffler is typically suspended underneath the frame, by the two hangers.

Improved arrangements have been sought, with respect to such factors as: strength; cost of materials; and, ease of assembly.

SUMMARY OF THE INVENTION

According to the present invention, a combination of a muffler and a mounting band is provided. The muffler is typically to be secured in a hanging orientation. The mounting band is constructed and arranged to secure the muffler in a hanging orientation. Preferably, the mounting band comprises a continuous, arcuate metallic strap having first and second ends. The continuous, arcuate metallic strap is positioned in extension circumferentially around the muffler. The first and second ends of the metallic strap are preferably welded to one another to retain the metallic strap as a continuous band around the muffler. The mounting band also includes a hanger secured to a continuous portion of the metallic strap. Preferably, the hanger is centered radially along the strap at a location about 150° to 210° from the weld.

In certain preferred arrangements, the hanger includes an arcuate base and a central projection. Preferably, the hanger arcuate base extends between opposite ends over an arc of about 35° to 50°. Preferably, the hanger arcuate base extends, between opposite ends, over an arcuate distance of about 3–5 inches.

In some preferred embodiments, the hanger comprises a single extension of a folded metal strip. This provides for, among other things, a convenient fabrication process. In other embodiments, the hanger comprises a single powder metal piece.

Preferably, the hanger central projection includes a hanger aperture therethrough. This allows the combination to be suspended from a truck frame by engagement between the hanger aperture and various brackets, mounting hooks, or other structural features on a truck.

In preferred arrangements, the hanger arcuate base includes first and second base segments. Preferably, the first and second base segments extend arcuately in generally opposite directions from the hanger central projection. The first base segment preferably includes a first tip and opposite side edges. Preferably, the first base segment opposite side edges taper toward one another in portions thereof adjacent to the first tip. The second base segment preferably includes a second tip and opposite side edges. Preferably, the second base segment opposite side edges taper toward one another in portions thereof adjacent to the first tip. In certain preferred embodiments, the first base segment opposite side edges taper toward one another along inwardly directed, concave edge portions; and, the second base segment opposite side edges taper toward one another along inwardly directed, concave edge portions.

In some preferred arrangements, the first and second ends of the metallic strap are welded to one another along an overlap seam. The axial length of the weld preferably is within the range of about 0.75 to 1.25 inches.

Preferably, the metallic strap is about 1.5 to 2.5 inches wide, and 14 gage thick.

In certain preferred embodiments, the hanger base has a width in a direction orthogonal to its direction of arcuate extension of no greater than about 90% of the width of the metallic strap.

According to the present invention, a method of mounting a muffler is provided. In general, the method comprises mounting a muffler in a horizontal orientation to a truck by positioning a continuous metallic strap circumferentially around the muffler, wherein the metallic strap has first and second ends welded to one another to retain the metallic strap as a continuous band around the muffler. Further, the step includes securing a hanger to the truck, wherein the hanger is secured to a continuous portion of the metallic strap at a location about 150°–210° from the weld of the metallic strap ends.

BRIEF DESCRIPTION OF THE DRAWINGS

FIG. 1 is a fragmentary, schematic, side elevational view of a muffler having two mounting band arrangements according to the present invention operably secured thereon;

FIG. 2 is a side elevational view of a mounting band analogous to those shown in FIG. 1; the mounting band of FIG. 2 being shown in a closed orientation;

FIG. 3 is a side elevational view of the mounting band shown in FIG. 2, but depicted in an open orientation;

FIG. 4 is a side elevational view of a hanger component of the mounting band arrangements shown in FIGS. 1–3;

FIG. 5 is an end elevational view of the arrangement shown in FIG. 4;

FIG. 6 is a top plan view of a strap of material from which the hanger of FIGS. 4 and 5 can be folded or bent;

FIG. 9 is a side elevational view of an alternate hanger to the one shown in FIG. 4;

FIG. 10 is an end elevational view of the hanger shown in FIG. 9;

FIG. 11 is a top plan view of a strap of material from which the hanger of FIGS. 9 and 10 can be folded or bent;

DETAILED DESCRIPTION OF THE PREFERRED EMBODIMENTS

Figure 8:
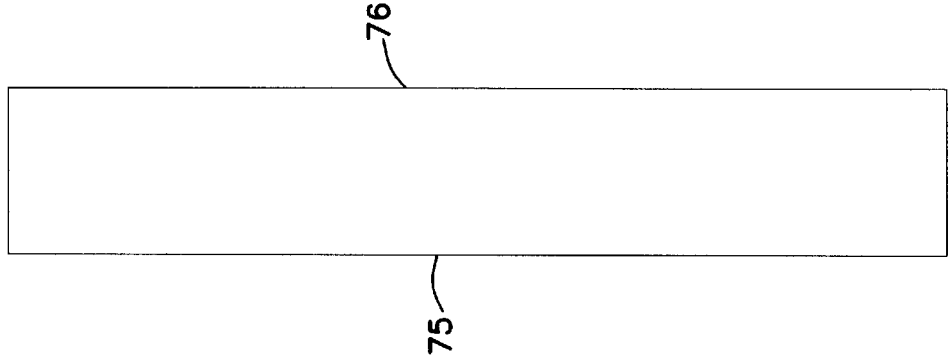
FIG. 8 is an end elevational view of the arrangement shown in FIG. 7.

Conventional mounting bands have a gap in the strap located at the hanger location. This gap causes stresses in the hanger and mounting band, as this is the point of all of the loading. Although no particular theory is asserted herein, it is believed that by locating the gap at the opposite side of the hanger, the forces on the band closure weld are small, and cause no problem of breakage. Further, no bending forces can be placed on the band end when it is on the opposite side of the hanger. The hanger benefits, as the band is continuous underneath the hanger, minimizing the forces on the hanger.

In reference now to FIG. 1, a combination 1 is illustrated according to the present invention. The combination 1 comprises a muffler 2 and a pair of mounting bands 3.

The muffler 2 may be any of a variety of truck mufflers of the type generally assembled for mounting a substantially horizontal configuration, with respect to the direction of extension of longitudinal line 5. The muffler 2 may be a catalytic muffler, i.e. a muffler including a catalytic converter therein, if desired. In typical systems, the muffler 2 will have a generally cylindrical outer shell 6, with a generally circular outer circumference. The outer diameter of the shell 6 would generally be at least about 10 in. (25 cm) and typically about 11 in. (28 cm).

Mufflers of the type described above are generally used for such vehicles as medium duty trucks. A typical weight of the mufflers is at least about 25 lbs. (11 kg), typically 30–50 lbs. (14–23 kg). The muffler's cylindrical extension has a typical length of 24 to 45 in. (61–114 cm).

Referring again to FIG. 1, muffler 2 again includes two mounting bands 3 thereon. Each of the mounting bands 3 includes a strap or strap portion 8 and a hanger or hanger portion 9. Each hanger 9 includes a hanger aperture 10 extending therethrough. The combination 1 can be suspended from a truck frame by engagement between the hanger apertures 10 and various brackets, mounting hooks, or other structural features on the truck. From this it will be understood that in general, due to the weight of the muffler 2, the mounting bands 3 must withstand substantial stress and forces during use.

It is noted that in many instances a combination such as combination 1 will be premanufactured as a subassembly which is then mounted on a truck during manufacture or assembly of the vehicle.

Attention is now directed to FIG. 2. In FIG. 2, a side elevational view of mounting band 3 is presented. As indicated above, the mounting band 3 comprises strap 8 and hanger 9. The strap 8 is a continuous, circular, extension 12. The continuous extension 12 is formed from a continuous strap 13 having first end 14 and second end 15. The first and second ends 14 and 15 of strap 8 are joined to one another along a seam located generally at 16 when the strap 8 is closed. Preferably, the joining of ends 14 and 15 is via an overlap seam 16a and by means of weld 17.

Preferably, extension 12 is continuous, with no other gaps, breaks, or interruptions therein, in extension between ends 14 and 15. That is, preferably extension 12 contains no apertures, and it is a single piece of material extending continuously between end 14 and end 15. Most preferably, it is metallic for strength.

In FIG. 3, mounting band 3 is shown with ends 14 and 15 not joined to one another, i.e. with the strap 8 open. The mounting band 3 shown in FIG. 3 is depicted as it would appear before being secured around (or closed around) a muffler, such as muffler 2, FIG. 1. Ends 14 and 15, not being secured to one another by the weld 16 (FIG. 2), terminate with a gap or bite 20 therebetween. As a result, legs 21 and 22 of continuous strap 12 are formed. The legs 21 and 22 can be spread apart, for positioning the mounting band 3 around a muffler 2. Preferably, the mounting band 3, when closed around a muffler has an internal diameter of at least 10 inches (25 cm), and typically about 11 inches (28 cm).

As will be apparent from FIGS. 2 and 3, preferably weld 17, or the gap 20, are located, radially around the extension of continuous strap 12, approximately oppositely from a central portion or center 25 of hanger 9. Preferably, center 25 is oriented around the continuous strap 12 approximately 150°–210°, radially, from gap 20 or seam 16 (i.e. weld 17). Most preferably, center 25 is positioned approximately 180° from overlap seam 16, in preferred embodiments.

Still referring to FIGS. 2 and 3, hanger 9 includes base 30 and projection 31. In general, hanger 9 is secured to strap 12 along base 30; and, projection 31 includes hanger aperture 10 therein. Preferably, projection 31 is oriented approximately over center 25, between ends 33 and 34 of hanger 9. That is, projection 31 extends over the center 25 of hanger 9, and projects in a direction outwardly from strap 8.

Referring to FIGS. 2 and 4, preferably base 30 is an arcuate base 37. That is, preferably base 30 has a generally arcuate shape in extension (underneath) between ends 33 and 34. In preferred arrangements, the degree of extension of the arcuate base 37 between ends 33 and 34 is about 35° to 50°, most preferably about 42°, and the arcuate distance is about 3–5 inches (8–13 cm), typically about 4.1 inches (10 cm). The radius of curvature of the arcuate base 37 will depend upon the diameter chosen for the strap 12. Preferably, it approximates the radius of curvature for the strap 12, and thus will typically be based on a radius of curvature of 5 inches (13 cm) or more, typically about 5.6 inches (14 cm).

The particular hanger 9 shown in FIGS. 2, 3, 4, 5 and 6 comprises a single extension 41 of material which has been folded and bent to form the hanger 9. This is apparent from an examination of FIG. 4, which is a side elevational view of the hanger 9. The hanger 9 in FIG. 4 is formed from a metallic extension which, when flattened, before folding and bending has the configuration generally shown at 45 in FIG. 6. It can be seen in FIG. 4 that the extension 41 is provided with folds or bends 47, 48 and 49, in addition to arcuate bends 50 and 51. Preferably arcuate bends 50 and 51 are provided to a radius of about 5 to 6 inches (13–15 cm), typically about 5.6 inches (14 cm). Preferably bends 47 and 49 are equal, around a radius of about 0.25 to 0.75 inches (6–19 mm), typically about 0.5 inches (13 mm). Fold 48 should generally be a 180° fold.

In FIG. 5, the arrangement of FIG. 4 is shown in end elevational view. In this FIG., hanger aperture 10 is viewable extending through portion or projection 31 of hanger 9. Typical dimensions for aperture 10 are about 0.25–0.75 inches (6–19 mm), and preferably about 0.5 inches (13 mm).

Attention is now directed to FIG. 6. From FIG. 6, it can be seen that piece 45, from which hanger 9 is formed, has first and second opposite side edges 55 and 56, opposite ends or tips 58 and 59, and tapering edge sections 61, 62, 63 and 64. More specifically, tapering edge section 63 tapers in extension from side edge 55 and tip 59; tapering edge section 64 tapers in extension from side edge 56 and tip 59; tapering edge 61 tapers in extension from side edge 55 and tip 58; and tapering edge 62 tapers in extension from side edge 56 and tip 58. The preferred tapering edges are curved, preferably arcuate or concave, in extension between the associated side edge and the associated tip. Preferred tips 58 and 59 are approximately 0.25 to 0.5 inches (6–13 mm), typically about 0.4 inches (10 mm) wide. The preferred curved tapering sections 61, 62, 63, 64 preferably are provided along a radius curvature of about 1 to 3 inches (3–8 cm), typically, about 2.0 inches (5 cm). The preferred piece 45 is preferably about 1 to 2 inches (3–5 cm), typically about 1.5 inches (4 cm) wide between side edges 55 and 56. Most preferably, it is of an appropriate width to provide a hanger 9 having a width of about 60% to 90% typically, about 75% of the width of the strap 12 on which it will be mounted in use. That is, preferably the hanger 9 is centrally positioned on the strap 19 with side edges 55 and 56 respectively spaced from each respective side edge 75, 76 (FIG. 8) of the associated strap 12, during use, at least about 0.1 to 0.4 inches (3–10 mm) and preferably at least about 0.25 inches (6 mm).

Piece 45 has a length extending between tips 58 and 59 of about 6–10 inches (15–25 cm), typically about 8–9 inches (20–23 cm), and preferably about 8.4 inches (21 cm).

From a view of FIGS. 4, 5 and 6, it can be understood that the hanger 9 includes first and second side extensions 67 and 68, on base 30. The side extensions 67, 68 project outwardly from center projection 31, in opposite directions. Each of the side extensions 67 and 68 include a pair of tapered edges thereon, narrowing the width of the side extension 67, 68 during a portion thereof extending between the projection 31 and the associated one of the tips 58, 59.

Most preferably, hanger 9 is secured to strap 12 by welding, with welding located along tapered edges 61, 62, 63 and 64. This will help ensure that the weld is not located along the edge of the associated strap 12. This is preferred, since welds along the edges 75, 76 (FIG. 8) of strap 12 can create points of weakening or potential breakage. The arcuate, curved concave shape shown for the preferred embodiments, is convenient for welding of the type just described, in typical processing.

Note that the hanger 9 is secured on a continuous portion of strap 12. That is, strap 12 includes no gaps, holds or bites therein which are positioned immediately underneath hanger 9. Rather, the hanger 9 is secured to the strap 12 at a location generally opposite (150°–210° separated from) the only gap or bite 20 found in the strap 12.

Figure 7:
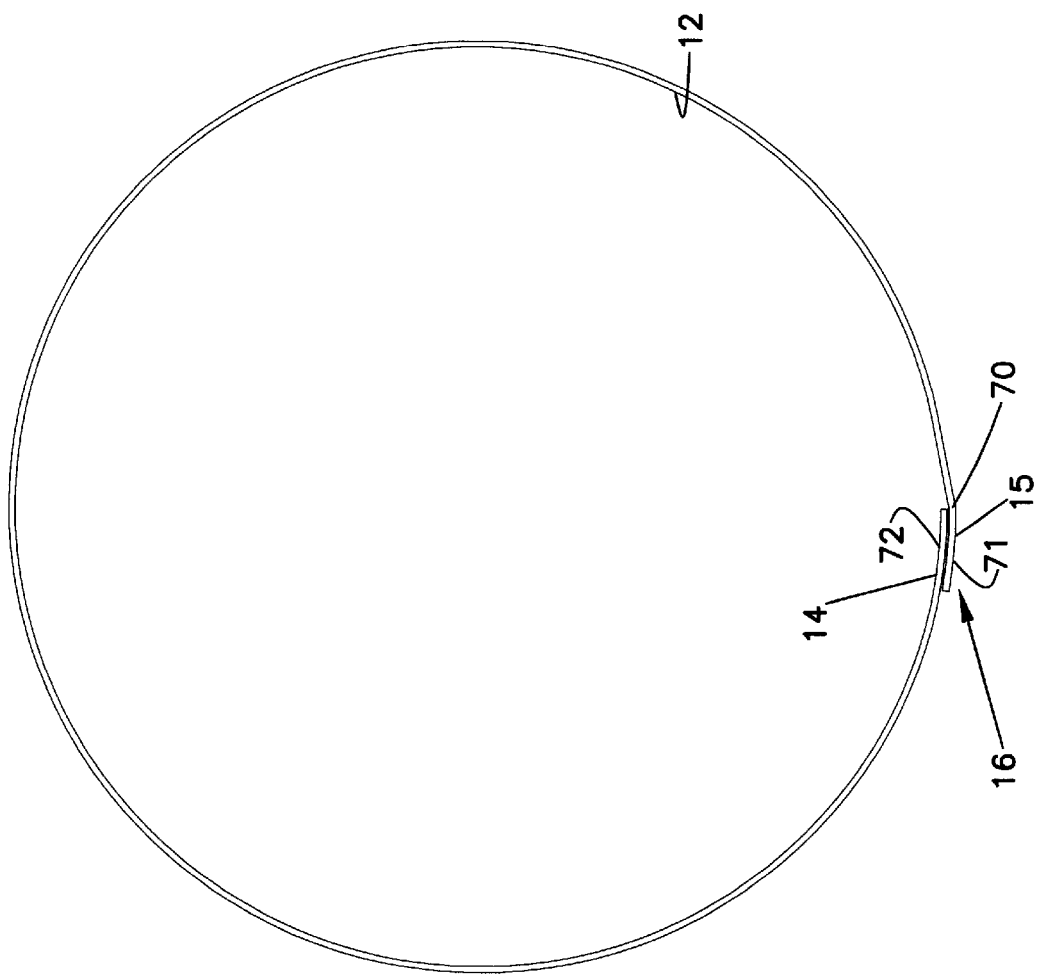
FIG. 7 is a side elevational view of a strap component of the mounting band arrangement shown in FIGS. 1–3.

Attention is now directed to FIGS. 7 and 8. In FIGS. 7 and 8, strap 12 is depicted. Note that strap 12 depicted in FIG. 7 is shown with an overlap seam 16. That is, end 15 includes a slight bend 70 thereat, to form a portion 71 which can overlap portion 72 adjacent to end 14, when strap 12 is configured to form a circular hoop, prior to welding. The distance of the overlap portion 71 is about 0.75–1.25 inches (19–32 mm), preferably about 1 inch (25 mm). The preferred strap 12 is otherwise merely a cylindrical strap having first and second opposite, generally parallel side edges 75 and 76, FIG. 8. A preferred width for strap 12 is at least about 1.5 inches (38 mm), typically about 1.75 to 2.5 inches (44–64 mm) and preferably about 2 inches (51 mm). It is foreseen that with typical embodiments involving mufflers on the order of about 11 inches (28 cm) in diameter, and weighing about 30 to 50 lbs. (14–23 kg), straps on the order of about 2 inches (51 mm) wide will be preferred.

Hanger 9 is preferably constructed of a metal material. Preferably, the material is steel, having a thickness of 0.07 inches (2 mm), and the following properties: 30 KSI yield strength; 50 KSI ultimate strength; and 20% elongation with aluminum coated surfaces.

Attention is now directed to the arrangement of FIGS. 9, 10 and 11. The arrangement of FIGS. 9, 10 and 11 is an alternate hanger, useable with straps generally according to FIGS. 7 and 8, to form alternate mounting bands to the ones shown in FIGS. 1–3. In FIGS. 9 and 10, an alternate hanger 89 is shown. In FIG. 11 the general configuration for preferred metal piece from which the hanger of FIGS. 9 and 10 could be folded, as shown. Preferred dimensions for the piece shown in FIG. 11 are as follows:

A base 90 is arcuate in configuration, between ends 91 and 92. The degrees of extension between ends 91 and 92 are about 35°–50°, typically about 42°. The arcuate distance is about 3–5 inches, preferably about 4.1 inches. The length of a chord extending between end 90 and end 91 is about 3–5 inches (8–13 cm), preferably about 4 inches (10 cm). The radius of curvature of the arcuate base 90 approximates the radius of curvature for the strap upon which it is used, and thus will typically be based on a radius of curvature of 5 inches (8 cm) or more, typically about 5.6 inches (14 cm).

Arcuate bends 93, 94 preferably are equal to each other. Typically, they will be on a radius of about 5.6 inches (14 cm). Bends 95, 96 are on a radius of about 0.25 to 0.75 inches (6–19 mm), typically about 0.5 inches (13 mm). Fold 97 is a 180° fold.

In reference now to FIG. 11, it can be seen that piece 98, from which hanger 89 is formed, has first and second opposite side edges 99 and 100; opposite ends or tips 101 and 102; and tapering edge sections 103, 104, 105, and 106. Preferred tips 101 and 102 are approximately 0.25 to 0.5 inches wide (6–13 mm), typically about 0.4 inches (10 mm) wide. The preferred curved tapering sections 103, 104, 105, 106 preferably are provided along a radius of curvature of about 1–3 inches (25–76 mm), typically about 2 inches (51 mm). The preferred piece 98 is preferably about 1–2 inches (25–51 mm), typically about 1.5 inches (38 mm) wide between side edges 99 and 100. Piece 98 includes a length between tips 101 and 102 of between about 9–15 inches (23–38 cm), typically about 13–14 inches (33–36 cm), and preferably about 13.6 inches (35 cm).

In FIG. 10, the arrangement of FIG. 9 is shown in elevational view. In this FIG., a hanger aperture 107 is viewable extending through hanger 89. Typical dimensions for aperture 107 are about 0.1–0.6 inches (3–15 mm), and preferably about 0.4 inches (10 mm).

Preferably, hanger 89 in FIGS. 9–11 is constructed of a metal. Preferably, the metal is aluminized steel, at least 0.098 inches (2.5 mm) thick.

Figure 13:
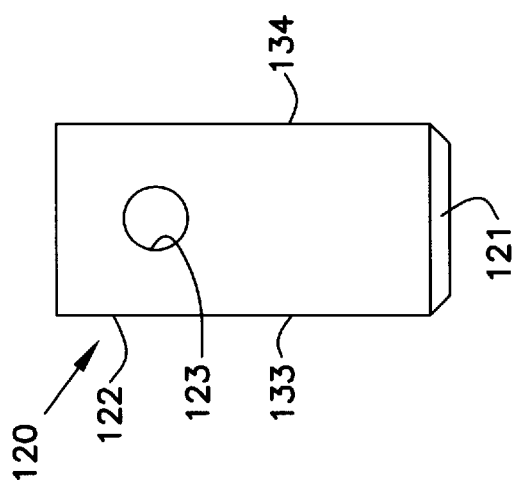
FIG. 13 is an end elevational view of the hanger shown in FIG. 12.
Figure 12:
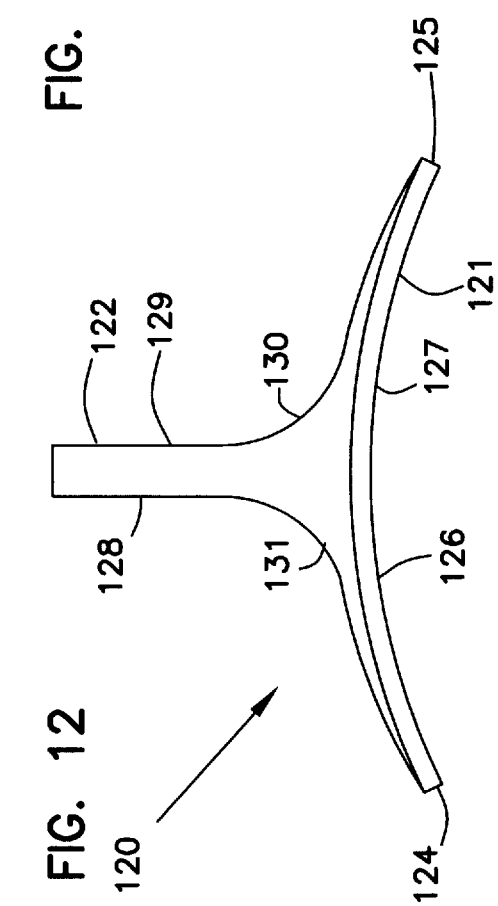
FIG. 12 is a side elevational view of an alternate hanger to the ones shown in FIGS. 1–11.

Attention is now directed to FIGS. 12 and 13. It is foreseen that in some applications, the hanger 9, instead of being folded from an extension of metal, could be formed of a unitary piece. One such arrangement is shown in FIGS. 12 and 13. It can be seen that the hanger 120 shown in FIGS. 12 and 13 is of unitary construction, for example, powder metal steel, preferably low carbon powder metal, having base 121 and projection 122 with hanger aperture 123 therein. For use with an arrangement such as that shown in FIGS. 1–3, in place of hanger 9 depicted therein, hanger 120 preferably has the following dimensions:

Preferably base 121 is arcuate between ends 124 and 125. In preferred arrangements, the degree of extension of the arcuate base 121 between ends 124 and 125 is about 40°–60°, preferably about 53°, and the arcuate distance is about 5–6 inches (127–152 mm), typically about 5.2 inches (132 mm). The radius curvature of the arcuate base 121 depends upon the diameter chosen for the strap. Preferably, it approximates the radius of curvature for the strap and thus will typically be based on a radius of curvature of 5 inches (13 cm) or more, typically about 5.6 inches (14 cm). The chord length between ends 124 and 125 is typically about 4.5–5.5 inches (11–14 cm), preferably about 5 inches (13 cm).

Bend 126 and bend 127 are typically equal. Preferably, they are on a radius of between 5–7 inches (13–18 cm), preferably about 5.9 inches (15 cm).

The width of projection 122 between edges 128 and 129 is between about 0.2–0.6 inches (5–15 mm), typically about 0.4 inches (10 mm).

Bends 130 and 131 are preferably on an equal radius. Typically, the bends 130, 131 are based on a radius of between 0.5–1.5 inches (13–38 mm), preferably about 1 inch (25 mm).

Projection 122 has a width between edges 133 and 134 of about 1–2 inches (25–51 mm), preferably about 1.5 inches (38 mm). Hanging aperture 123 has a diameter within the range of about 0.25–0.75 inches (6–19 mm), preferably about 0.5 inches (13 mm).

Figure 15:
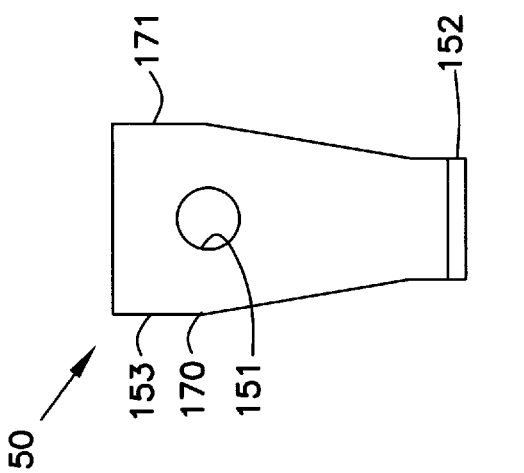
Figure 14:
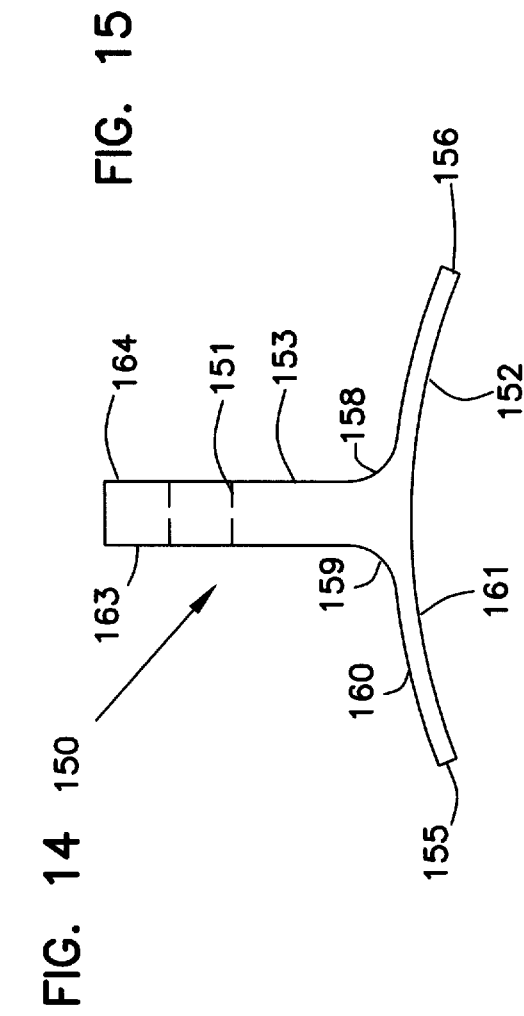
FIG. 14 is an alternate hanger arrangement to the ones shown in FIGS. 1–13; and, FIG. 15 is an end elevational view of the arrangement shown in FIG. 14.

An alternate hanger to the ones shown in FIGS. 12 and 13 is shown in FIGS. 14 and 15. Hanger 150 of FIGS. 14 and 15 also generally comprises a unitary, powder metal, piece. It includes hanger aperture 151 therein, having base 152 and projection 153, defining aperture 151, and possesses the following dimensions:

Base 152 has an arcuate shape in extension between ends 155 and 156. In preferred arrangements, the degree of extension of the arcuate base 152 between ends 155 and 156 is about 30°–50°, preferably about 42°, and the arcuate distance is about 3–5 inches (8–13 cm), typically about 4.1 inches (10 cm). The chord length between ends 155 and 156 is about 4 inches (10 cm). The radius of curvature of the arcuate base 152 depends upon the diameter chosen for the strap 12. Preferably, it approximates the radius of curvature for the strap 12, and thus will typically be based on a radius of curvature of about 5 inches (13 cm) or more, typically about 5.6 inches (14 cm).

Bends 158 and 159 are usually on about an equal radius, typically about 0.25–0.75 inches (6–19 mm), preferably about 0.5 inches (13 mm). The thickness of base 152 between surface 160 and surface 161 is about 0.1–0.2 inches (3–5 mm), typically about 0.16 inches (4 mm).

The thickness of projection 153 between surface 163 and surface 164 is between about 0.25–0.75 inches (6–19 mm), preferably about 0.5 inches (13 mm).

Attention is now direction to FIG. 15. As shown in FIG. 15, the width across the widest part of projection 153 is greater than the width across base 152. Typically, the projection 153 extends between 125–175%, preferably about 150%, greater than the width across the base 152. In preferred arrangements, the width of projection 153 between edges 170 and 171 is about 1–2 inches (25–51 mm), preferably about 1.5 inches (38 mm). The width of the base 152 is about 0.5–1.5 inches (13–38 mm), preferably about 1 inch (25 mm).

Also viewable in FIG. 15 is hanging aperture 151. Preferably, it has a diameter of about 0.25–0.75 inches (6–19 mm), typically about 0.5 inches (13 mm).

Hanger 150 is preferably of a unitary construction. Preferably, it is constructed of a powder metal, for example, low carbon powder metal steel.

A mounting band of the arrangement such as that illustrated in FIGS. 1–6 was tested for strength. It was found that the arrangement sustained a pull force of up to 12,000 lbF, until failure.

An arrangement such as that illustrated in FIGS. 12 and 13 was tested. It was found that this arrangement sustained a pull force of 5,500 lbF, until failure.

The above specification, examples and data provide a complete description of the manufacture and use of the invention. Many embodiments of the invention can be made without departing from the spirit and scope of the invention.

We claim:

1. A combination comprising:
   (a) a muffler;
   (b) a mounting band constructed and arranged to secure the muffler in a hanging orientation; said mounting band comprising:
      (i) a continuous, arcuate metallic strap having first and second ends;
         (A) said continuous, arcuate, metallic strap being positioned in extension circumferentially around the muffler;
         (B) said first and second ends of said metallic strap being welded to one another to form a weld to retain said metallic strap as a continuous band around the muffler;
      (ii) a hanger secured to a continuous portion of said metallic strap; said hanger being centered, radially along said strap, at a location about 150° to 210° from said weld.

2. A combination according to claim 1 wherein:
   (a) said hanger includes an arcuate base and a central projection.

3. A combination according to claim 2 wherein:
   (a) said hanger arcuate base extends, between opposite ends, over an arc of about 35° to 50°.

4. A combination according to claim 3 wherein:
   (a) said hanger arcuate base extends, between opposite ends, over an arcuate distance of about 3 to 5 inches.

5. A combination according to claim 4 wherein:
   (a) said hanger comprises a single extension of a folded metal strip.

6. A combination according to claim 5 wherein:
   (a) said hanger central projection includes a hanger aperture therethrough.

7. A combination according to claim 6 wherein:
   (a) said hanger arcuate base includes first and second base segments; said first and second base segments extending arcuately, in generally opposite directions from said hanger central projection.

8. A combination according to claim 7 wherein:
   (a) said first base segment includes a first tip and opposite side edges;
      (i) said first base segment opposite side edges tapering toward one another in portions thereof adjacent to said first tip;
   (b) said second base segment includes a second tip and opposite side edges;
      (i) said second base segment opposite side edges tapering toward one another in portions thereof adjacent to said first tip.

9. A combination according to claim 8 wherein:
   (a) said first base segment opposite side edges taper toward one another along inwardly directed, concave, edge portions; and
   (b) said second base segment opposite side edges taper toward one another along inwardly directed, concave, edge portions.

10. A combination according to claim 9 wherein:
(a) said first and second ends of said metallic strap are welded to one another at said weld along an overlap seam.

11. A combination according to claim 10 wherein:
(a) said weld at said overlap seam has an axial length within a range of about 0.75 to 1.25 inches.

12. A combination according to claim 11 wherein:
(a) said metallic strap is 1.5 to 2.5 inches wide.

13. A combination according to claim 12 wherein:
(a) said hanger base has a width, in a direction orthogonal to its direction of arcuate extension, of no greater than 90% of the width of the metallic strap.

14. A combination according to claim 13 wherein:
(a) the mounting band is circular, when closed, and has an internal diameter of at least 10 inches.

* * * * *